United States Patent
Saito

(10) Patent No.: US 12,406,535 B2
(45) Date of Patent: Sep. 2, 2025

(54) INFORMATION PROCESSING DEVICE AND INFORMATION PROCESSING METHOD

(71) Applicant: TOYOTA JIDOSHA KABUSHIKI KAISHA, Aichi-ken (JP)

(72) Inventor: Tadashi Saito, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 380 days.

(21) Appl. No.: 17/670,358

(22) Filed: Feb. 11, 2022

(65) Prior Publication Data

US 2022/0319243 A1 Oct. 6, 2022

(30) Foreign Application Priority Data

Mar. 30, 2021 (JP) .................... 2021-058246

(51) Int. Cl.
*G07C 5/00* (2006.01)
*G01C 21/36* (2006.01)
*G07C 5/08* (2006.01)

(52) U.S. Cl.
CPC ......... *G07C 5/006* (2013.01); *G01C 21/3605* (2013.01); *G07C 5/008* (2013.01); *G07C 5/0816* (2013.01)

(58) Field of Classification Search
CPC ...... G07C 5/006; G07C 5/008; G07C 5/0816; G01C 21/3605
See application file for complete search history.

(56) References Cited

U.S. PATENT DOCUMENTS

| | | | |
|---|---|---|---|
| 7,236,861 B2 * | 6/2007 | Paradis | F41H 13/00 701/120 |
| 2008/0004926 A1 * | 1/2008 | Horvitz | G06Q 10/06316 705/7.26 |
| 2019/0197798 A1 * | 6/2019 | Abari | G06Q 10/02 |
| 2021/0114626 A1 | 4/2021 | Hirose et al. | |

FOREIGN PATENT DOCUMENTS

| | | | | |
|---|---|---|---|---|
| CN | 112036615 A | * | 12/2020 | G06F 16/29 |
| JP | 2003187011 A | | 7/2003 | |
| JP | 2020013373 A | * | 1/2020 | |
| JP | 2020166760 A | * | 10/2020 | G06Q 10/0637 |
| WO | 2019/163194 A1 | | 8/2019 | |

OTHER PUBLICATIONS

JP-2020166760-A-translated, Kazunori, Oct. 8, 2020, G06Q10/0637.*

* cited by examiner

*Primary Examiner* — Amelia Vorce
*Assistant Examiner* — Shivam Sharma
(74) *Attorney, Agent, or Firm* — HAUPTMAN HAM, LLP

(57) ABSTRACT

An information processing device includes a control unit that executes: acquiring a first place where a demand for a dispatch service is predicted to be generated; and creating a first schedule of inspection or repair of a first vehicle that is used for the dispatch service, such that the inspection or the repair of the first vehicle is performed at a first shop and then the first vehicle arrives at the first place on a date and hour when the demand for the dispatch service is predicted to be generated, the first shop being a shop that is around the first place and where the inspection or the repair of the first vehicle is capable of being performed.

18 Claims, 13 Drawing Sheets

FIG. 4

VEHICLE INFORMATION DATABASE

| VEHICLE ID | VEHICLE TYPE | MODEL CODE | DISPATCH SERVICE | POSITION INFORMATION | TRAVELING DISTANCE | |
|---|---|---|---|---|---|---|
| | | | | | | ⋮ |
| | | | | | | ⋮ |
| | | | | | | ⋮ |
| | | | | | | ⋮ |
| | | | | | | ⋮ |

FIG. 5

SHOP INFORMATION DATABASE

| SHOP ID | POSITION | EQUIPMENT | MENU ID | SCHEDULE INFORMATION | MAINTENANCE HISTORY INFORMATION |
|---|---|---|---|---|---|
| | | | | | |
| | | | | | |
| | | | | | |

FIG. 6

MAINTENANCE MENU TABLE

| MENU ID | CONTENT | REQUIRED TIME |
|---|---|---|
|  |  |  |
|  |  |  |
|  |  |  |
|  |  |  |

FIG. 7

DISPATCH RESERVATION INFORMATION DATABASE

| RESERVATION ID | PLANNED GETTING-IN DATE AND HOUR | GETTING-IN PLACE | PLANNED ARRIVAL DATE AND HOUR | GETTING-OFF PLACE | DESIGNATION | VEHICLE ID |
|---|---|---|---|---|---|---|
| | | | | | | |
| | | | | | | |
| | | | | | | |

FIG. 8

MAINTENANCE SCHEDULE INFORMATION DATABASE

| SCHEDULE ID | VEHICLE ID | SHOP ID | PLANNED GARAGE ENTERING DATE AND HOUR | PLANNED GARAGE LEAVING DATE AND HOUR | MENU CONTENT | DESTINATION | PLANNED ARRIVAL DATE AND HOUR |
|---|---|---|---|---|---|---|---|
| | | | | | | | |
| | | | | | | | |
| | | | | | | | |

INFORMATION PROCESSING DEVICE AND INFORMATION PROCESSING METHOD

CROSS-REFERENCE TO RELATED APPLICATION

This application claims priority to Japanese Patent Application No. 2021-058246 filed on Mar. 30, 2021, incorporated herein by reference in its entirety.

BACKGROUND

1. Technical Field

The present disclosure relates to an information processing device and an information processing method.

2. Description of Related Art

There has been disclosed a technology of accepting vehicle information including a traveling distance of a vehicle at the time of inspection or repair, when the inspection or repair of the vehicle is performed, calculating a planned inspection or repair date from the vehicle information and a traveling distance, the number of hours and others until the inspection or repair is performed, and giving notice to a user for encouraging the user to perform garage entering (for example, Japanese Unexamined Patent Application Publication No. 2003-187011).

SUMMARY

An aspect of the present disclosure has an object to provide an information processing device and an information processing method that make it possible to shorten a time during which a dispatch service cannot be performed due to the inspection or repair of a vehicle that is used for the dispatch service.

An aspect of the present disclosure is
an information processing device including a control unit that executes:
  acquiring a first place where a demand for a dispatch service is predicted to be generated; and
  creating a first schedule of inspection or repair of a first vehicle that is used for the dispatch service, such that the inspection or the repair of the first vehicle is performed at a first shop and then the first vehicle arrives at the first place on a date and hour when the demand for the dispatch service is predicted to be generated, the first shop being a shop that is around the first place and where the inspection or the repair of the first vehicle is capable of being performed.

Another aspect of the present disclosure is
an information processing method including:
  acquiring a first place where a demand for a dispatch service is predicted to be generated; and
  creating a first schedule of inspection or repair of a first vehicle that is used for the dispatch service, such that the inspection or the repair of the first vehicle is performed at a first shop and then the first vehicle arrives at the first place on a date and hour when the demand for the dispatch service is predicted to be generated, the first shop being a shop that is around the first place and where the inspection or the repair of the first vehicle is capable of being performed.

With the present disclosure, it is possible to shorten the time during which the dispatch service cannot be performed due to the inspection or repair of the vehicle that is used for the dispatch service.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is an example of information that is held in a vehicle information database;

FIG. 5 is an example of information that is held in a shop information database;

FIG. 6 is an example of a maintenance menu table;

FIG. 7 is an example of information that is held in a dispatch reservation information database;

FIG. 8 is an example of information that is held in a maintenance schedule information database;

DETAILED DESCRIPTION OF EMBODIMENTS

Figure 1:
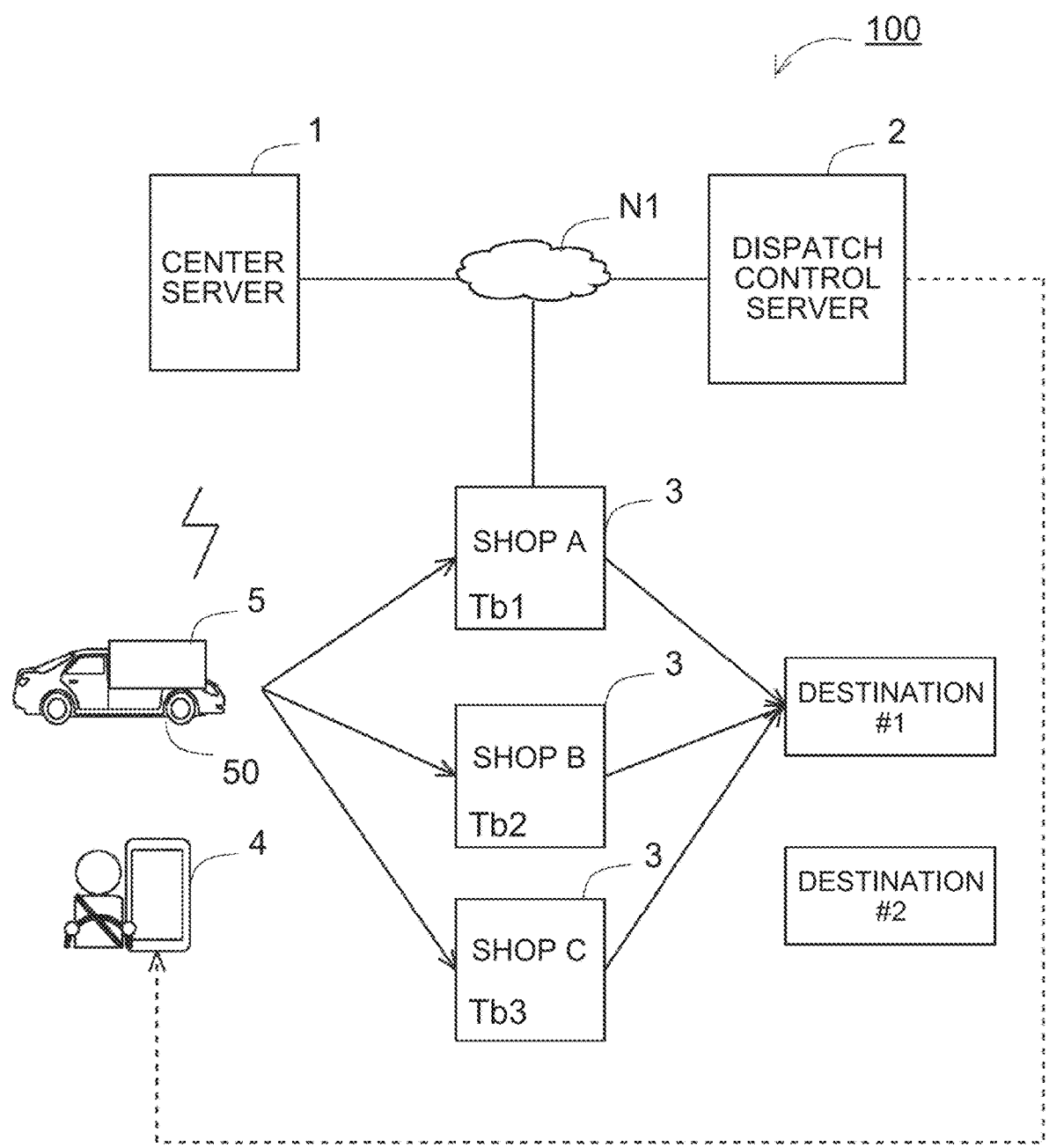
FIG. 1 is a diagram showing an example of the system configuration of a maintenance scheduling system according to a first embodiment.

As for a vehicle that is used for a dispatch service such as a taxi and ride-sharing, for example, when the operating time for the vehicle is decreased due to inspection, repair or the like, the business opportunity is lost by the decreased quantity. Meanwhile, the inspection and repair of the vehicle is necessary for safe traveling. A driver of the dispatch service hopes to reduce the time during which the business opportunity is lost due to the inspection or repair of the vehicle. Until a start hour in a reservation for the inspection or repair of the vehicle, the driver of the dispatch service can reduce the loss of the business opportunity at driver's discretion. However, after the inspection or repair of the vehicle, it is difficult to reduce the loss of the business opportunity at driver's discretion, because of future loss.

As an aspect of the present disclosure, for reducing the loss of the business opportunity after the inspection or repair of the vehicle that is used for the dispatch service, an information processing device is configured as follows. Specifically, the information processing device includes a control unit executes: acquiring a first place where a demand for a dispatch service is predicted to be generated; and creating a first schedule of inspection or repair of a first vehicle that is used for the dispatch service, such that the inspection or the repair of the first vehicle is performed at a first shop and then the first vehicle arrives at the first place on a date and hour when the demand for the dispatch service is predicted to be generated, the first shop being a shop that is around the first place and where the inspection or the repair of the first vehicle is capable of being performed.

For example, the information processing device is a computer such as a server. For example, the control unit is a processor that is included in computer. The first vehicle is a vehicle that is used for the dispatch service. The first vehicle may be an automobile that is driven by a driver, or may be an automobile that can perform automatic driving with no driver. Examples of the first place where the demand for the dispatch service is predicted to be generated include a getting-in place in a reservation for the dispatch service, an event place where people gather, a station of a railroad at the time of an accident or a bad weather, a place where the demand is predicted to be generated based on a past reservation history of the dispatch service, and the like. Examples of the first shop where the inspection or repair of the first vehicle is capable of being performed include a shop where equipment, a mechanic and the like corresponding to the menu of the inspection or repair of the first vehicle are disposed.

With the aspect of the present disclosure, the inspection or repair of the first vehicle is performed at the first shop around the place where the demand for the dispatch service is predicted to be generated. Further, the schedule of the inspection or repair of the first vehicle is created, such that the inspection or repair of the first vehicle is performed at the first shop and then the first vehicle arrives at the first place where the demand for the dispatch service is predicted to be generated, on the date and hour when the demand for the dispatch service is predicted to be generated. Therefore, after the end of the inspection or repair at the first shop, the first vehicle goes to the first place, and thereby the possibility that the first vehicle gets a passenger of the dispatch service becomes high, so that it is possible to restart the dispatch service earlier.

In the aspect of the present disclosure, the control unit may acquire a predicted value of a value indicating a level of the demand for the dispatch service, for each of a plurality of places where the demand is predicted to be generated, the control unit may decide that the first place is a place for which the predicted value is highest among the plurality of places, and when there is a plurality of shops where the inspection or the repair of the first vehicle is capable of being performed around the first place, the control unit decides that the first shop is a shop that is closest to the first place among the plurality of shops. For example, the predicted value of the value indicating the level of the demand for the dispatch service is a value that is evaluated based on the kind of the demand, the number of users that request the dispatch service, the number of vehicles that are requested in the dispatch service, or the like. With the aspect of the present disclosure, after the end of the inspection or repair at the first shop, the first vehicle goes to the first place for which the predicted value indicating the level of the demand for the dispatch service is highest, and thereby it is possible to further raise the possibility that the first vehicle gets a passenger.

In the aspect of the present disclosure, when the control unit acquires a plurality of places where the demand for the dispatch service is predicted to be generated and there is a plurality of shops where the inspection or the repair of the first vehicle is capable of being performed around the plurality of places, the control unit may decide that the first place and the first shop are respectively a place and a shop that have a shortest mutual distance. With the aspect of the present disclosure, after the end of the inspection or repair at the first shop, the first vehicle can arrive at the place where the demand for the dispatch service is predicted to be generated, earlier, and it is possible to further reduce the time during the loss of the business opportunity.

In the aspect of the present disclosure, when the control unit acquires a plurality of places where the demand for the dispatch service is predicted to be generated and there is a plurality of shops where the inspection or the repair of the first vehicle is capable of being performed around the plurality of places, the control unit may decide that the first place and the first shop are respectively a place and a shop included in a combination for which a total time length of a first time length, a second time length and a third time length is shortest among all combinations of a single place of the plurality of places and a single shop of the plurality of shops, the first time length being a time length that is spent on moving from a predetermined point to the single shop, the second time length being a time length that is spent on the inspection or the repair at the single shop, the third time length being a time length that is spent on moving from the single shop to the single place. With the aspect of the present disclosure, the first vehicle moves from the predetermined point to the first shop and receives the inspection or repair at the first shop, and the total time length for moving from the first shop to the first place becomes short, so that it is possible to further reduce the time during the loss of the business opportunity.

In the aspect of the present disclosure, the control unit may further execute: reserving the inspection or the repair of the first vehicle at the first shop; and requesting an arrangement of an implementation order of the inspection or the repair of the first vehicle, to the first shop, when there is a change in the demand for the dispatch service that is predicted to be generated around the first shop in the first schedule, the arrangement being such an arrangement that the inspection or the repair of the first vehicle is performed at a first shop and then the first vehicle arrives at a place where a demand after the change is predicted to be generated on a date and hour when the demand after the change is predicted to be generated. For example, when a planned end date and hour of the inspection or the repair in the first schedule is earlier, by a first time length or more, than the date and hour when the demand after the change is predicted to be generated, the control unit may send a notice of permission to decrease a priority of the implementation order of the inspection or the repair of the first vehicle, to the first shop. For example, when a planned end date and hour of the inspection or the repair in the first schedule is equal to or later than the date and hour when the demand after the change is predicted to be generated, the control unit may send an instruction to increase a priority of the implementation order of the inspection or the repair of the first vehicle, to the first shop.

With the aspect of the present disclosure, depending on the change in the demand for the dispatch service that is predicted, it is possible to alter the implementation order of the inspection or repair of the vehicle, at the first shop where the first inspection or repair of the first vehicle is performed. Thereby, for example, in the case where there is sufficient spare time between the planned end date and hour of the inspection or repair of the first vehicle and the date and hour when the demand after the change is predicted to be generated, in the first shop, it is possible to decrease the priority of the inspection or repair of the first vehicle, and to execute the inspection or repair of another vehicle having a higher priority than the first vehicle, before the inspection or repair of the first vehicle. Thereby, in the first shop, it is possible to perform the inspection or repair of vehicles such that vacant time is short. On the contrary, for example, in the case where the planned end date and hour of the inspection or repair of the first vehicle is equal to or later than the date and hour when the demand after the change is predicted to be generated, the priority of the inspection or repair of the first vehicle is increased, and thereby the implementation order of the inspection or repair of the first vehicle in the first shop becomes earlier. Thereby, the first vehicle can arrive at the place where the demand for the change is predicted to be generated, on the date and hour when the demand after the change is predicted to be generated, so that it is possible to reduce the loss of the business opportunity of the dispatch service with the first vehicle.

Another aspect of the present disclosure can be specified as an information processing method in which the above information processing device executes the above process. That is, the information processing method includes: acquiring a first place where a demand for a dispatch service is predicted to be generated; and creating a first schedule of inspection or repair of a first vehicle that is used for the dispatch service, such that the inspection or the repair of the first vehicle is performed at a first shop and then the first vehicle arrives at the first place on a date and hour when the demand for the dispatch service is predicted to be generated, the first shop being a shop that is around the first place and where the inspection or the repair of the first vehicle is capable of being performed.

Further, another aspect of the present disclosure can be specified as a program that causes a computer to execute the process in the above information processing method or a non-transitory computer-readable recording medium in which the program is stored.

Embodiments of the present disclosure will be described below based on the drawings. The configurations of the embodiments described below are examples, and the present disclosure is not limited to the configurations of the embodiments.

First Embodiment

FIG. 1 is a diagram showing an example of the system configuration of a maintenance scheduling system 100 according to a first embodiment. The maintenance scheduling system 100 is a system that schedules the inspection or repair of the vehicle. In the first embodiment, the maintenance scheduling system 100 provides a service with the vehicle that is used for the dispatch service.

The maintenance scheduling system 100 includes a center server 1, a dispatch control server 2, a shop server 3 and an in-vehicle device 5. A plurality of shop servers 3 and a plurality of in-vehicle devices 5 are included, but in FIG. 1, a single shop server 3 and a single in-vehicle device 5 are extracted and shown. A plurality of dispatch control servers 2 may be included, but in the first embodiment, only a single dispatch control server 2 is included. The center server 1, the dispatch control server 2, the shop server 3 and the in-vehicle device 5 are connected with a network N1, and can communicate with each other through the network N1.

For example, the center server 1 is a server of the manufacturer of the vehicle 50, and monitors the traveling state of the vehicle 50 by periodically receiving information indicating the traveling state of the vehicle 50 from the in-vehicle device 5 mounted on the vehicle 50. Hereinafter, the information indicating the traveling state of the vehicle is referred to as traveling state information. For example, the traveling state information includes information about the vehicle 50, as exemplified by identification information, position information, traveling distance and information indicating the state of each component. For example, the information indicating the state of the component includes information indicating the degree of the abrasion of the component and information indicating whether the component is broken down.

The shop server 3 is a server in a shop of a dealer for the manufacturer of the vehicle 50, an automobile inspection-repair operator that is tied up with the manufacturer, or the like. Hereinafter, a shop means a shop where the inspection or repair of the vehicle is performed.

The center server 1 communicates with the shop server 3 installed in each shop, and holds information about equipment and schedule information about the inspection or repair for each shop. The dispatch control server 2 is a server of a business operator that provides the dispatch service. The dispatch control server 2 communicates with a user terminal 4 of a user that is registered as a driver for the dispatch service, and sends an instruction for moving to a designated getting-in place for a passenger, to the user terminal 4, when a request for dispatch is generated.

The entrance of the vehicle to the shop for the inspection or repair is referred to as garage entering. For example, the garage entering includes a periodic garage entering that is performed at a predetermined timing and an urgent garage entering that is performed in response to the occurrence of an abnormality. In the first embodiment, the center server 1 determines whether the periodic garage entering or urgent garage entering of the vehicle 50 is performed, based on the traveling state information from the in-vehicle device 5. Hereinafter, the inspection and the repair are collectively referred to as maintenance.

When the center server 1 determines that the periodic garage entering or urgent garage entering of the vehicle 50 is performed, the center server 1 acquires a planned maintenance date and hour based on the traveling state information. The center server 1 extracts a shop where the maintenance of the vehicle 50 can be performed, from shops that exist in a predetermined range. For example, the extraction range of the shop is a range of a predetermined distance from a predetermined point or an area that is defined in advance and that contains a departure point. The shop where the maintenance can be performed is a shop that includes maintenance equipment and a mechanic corresponding to the equipment and performance of the vehicle 50 and that is available on the planned maintenance date and hour.

Next, the center server 1 acquires a place where the demand for the dispatch service in a predetermined range is predicted to be generated after the planned maintenance date and hour for the vehicle 50. For example, the extraction range of the place where the demand is predicted to be generated may be a predetermined range from the previously extracted shop, may be the same as the extraction range of the shop, or may be set to a wider range including the extraction range of the shop. Examples of the demand for the dispatch service include a reservation for the dispatch service, an event that is performed while people are gathered, a bad weather and a construction. Examples of the point where there is the demand for the dispatch service include a place where a passenger having a reservation for the dispatch service gets in the vehicle, a place where an event is curried out, and a station of a public transit agency. For example, a high demand for the dispatch service means that a predicted value of a value indicating the level of the demand for the dispatch service is equal to or higher than a predetermined value. For example, the value indicating the demand for the dispatch service is acquired based on the kind of the demand, the number of users that request the dispatch service, or the number of vehicles that are requested in the dispatch service. The value indicating the demand for the dispatch service is not limited to this. Hereinafter, the predicted value of the value indicating the demand for the dispatch service is referred to as the predicted value of the demand.

For the place where the demand for the dispatch service in the predetermined range is predicted to be generated, the center server 1 decides a destination and a shop where the maintenance of the vehicle 50 is performed in the schedule of the maintenance of the vehicle 50, based on the predicted value of the demand, the distance from the shop, and the like. In the first embodiment, the center server 1 sets a place where the demand for the dispatch service is highest, as a destination y, and sets a shop x that is closest to the destination y, as the shop where the maintenance of the vehicle 50 is performed. Then, the center server 1 reserves the maintenance of the vehicle 50 at the shop x, such that the vehicle 50 arrives at the destination y by a date and hour when the demand for the dispatch service becomes high. Further, the center server 1 creates a schedule having a content in which the vehicle 50 receives the maintenance at the shop x and then goes to the destination y, and gives a notice of the schedule to the user terminal 4 of the driver of the vehicle 50 through the dispatch control server 2. The vehicle 50 is an example of the "first vehicle". The destination in the schedule of the maintenance of the vehicle 50 is an example of the "first place". The shop where the maintenance of the vehicle 50 is performed is an example of the "first shop".

With the first embodiment, as the schedule of the maintenance of the vehicle 50, the center server 1 creates a schedule in which the vehicle 50 receives the maintenance at the shop x such that the vehicle 50 arrives at the destination y by the hour when the demand for the dispatch service becomes high. Thereby, the possibility that the vehicle 50 used for the dispatch service gets a passenger for the dispatch service earlier after the maintenance becomes high, so that it is possible to reduce the loss of the business opportunity due to the maintenance of the vehicle.

Figure 2:
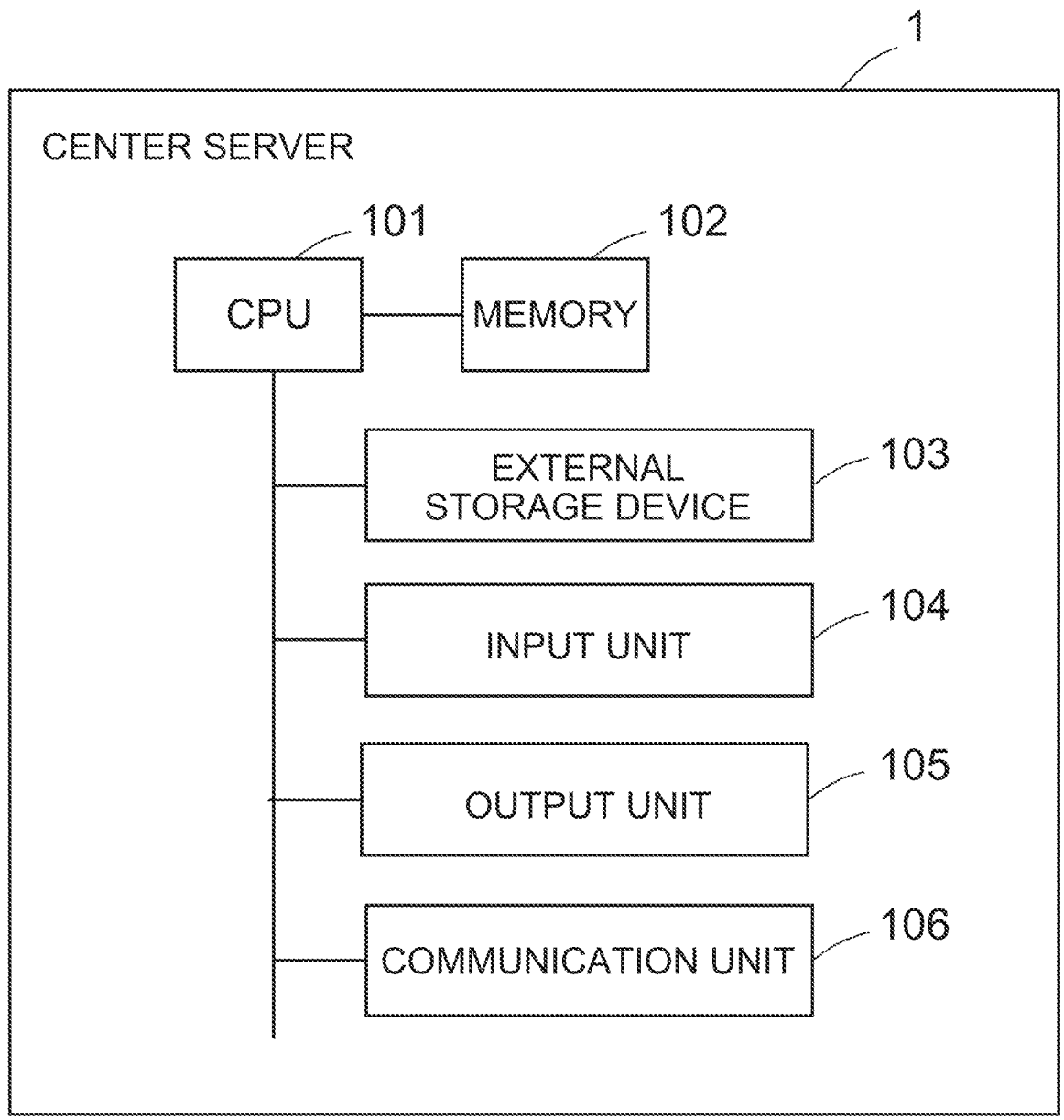
FIG. 2 is a diagram showing an example of the hardware configuration of a center server.

FIG. 2 is a diagram showing an example of the hardware configuration of the center server 1. For example, the center server 1 is a dedicated computer such as a server or a general-purpose computer such as a personal computer (PC). The center server 1 includes a central processing unit (CPU) 101, a memory 102, an external storage device 103, an input unit 104, an output unit 105 and a communication unit 106, as the hardware configuration. The memory 102 and the external storage device 103 are computer-readable recording media.

The external storage device 103 contains various programs and data that is used by the CPU 101 for the execution of the programs. For example, the external storage device 103 is an erasable programmable ROM (EPROM) or a hard disk drive. For example, the program held in the external storage device 103 includes an operating system (OS), a control program for the maintenance scheduling system 100, and other various application programs.

The memory 102 is a storage device that provides a storage region and a working region for loading the program contained in the external storage device 103, to the CPU 101, or that is used as a buffer. For example, the memory 102 includes a semiconductor memory such as a read only memory (ROM) and a random access memory (RAM).

The CPU 101 executes various processes by loading the OS and various application programs held in the external storage device 103 on the memory 102 and executing the OS and various application programs. The number of CPUs 101 is not limited to one, and a plurality of CPUs 101 may be included. The CPU 101 is an example of the "control unit".

For example, the input unit 104 is an input device including a keyboard and a pointing device such as a mouse. A signal input from the input unit 104 is output to the CPU 101. The output unit 105 is an output device such as a display and a printer. The output unit 105 outputs information in response to the input of a signal from the CPU 101. The input unit 104 and the output unit 105 may be a voice input device and a voice output device, respectively.

The communication unit 106 is an interface that performs the input and output of information with a network. The communication unit 106 may be an interface that is connected with a wired network, or may be an interface that is connected with a wireless network. For example, the communication unit 106 is a network interface card (NIC), a wireless circuit or the like. The hardware configuration of the center server 1 is not limited to the hardware configuration shown in FIG. 2. Similarly to the center server 1, the dispatch control server 2 has a hardware configuration including a CPU, a memory, an external storage device, an input unit, an output unit and a communication unit.

Figure 3:
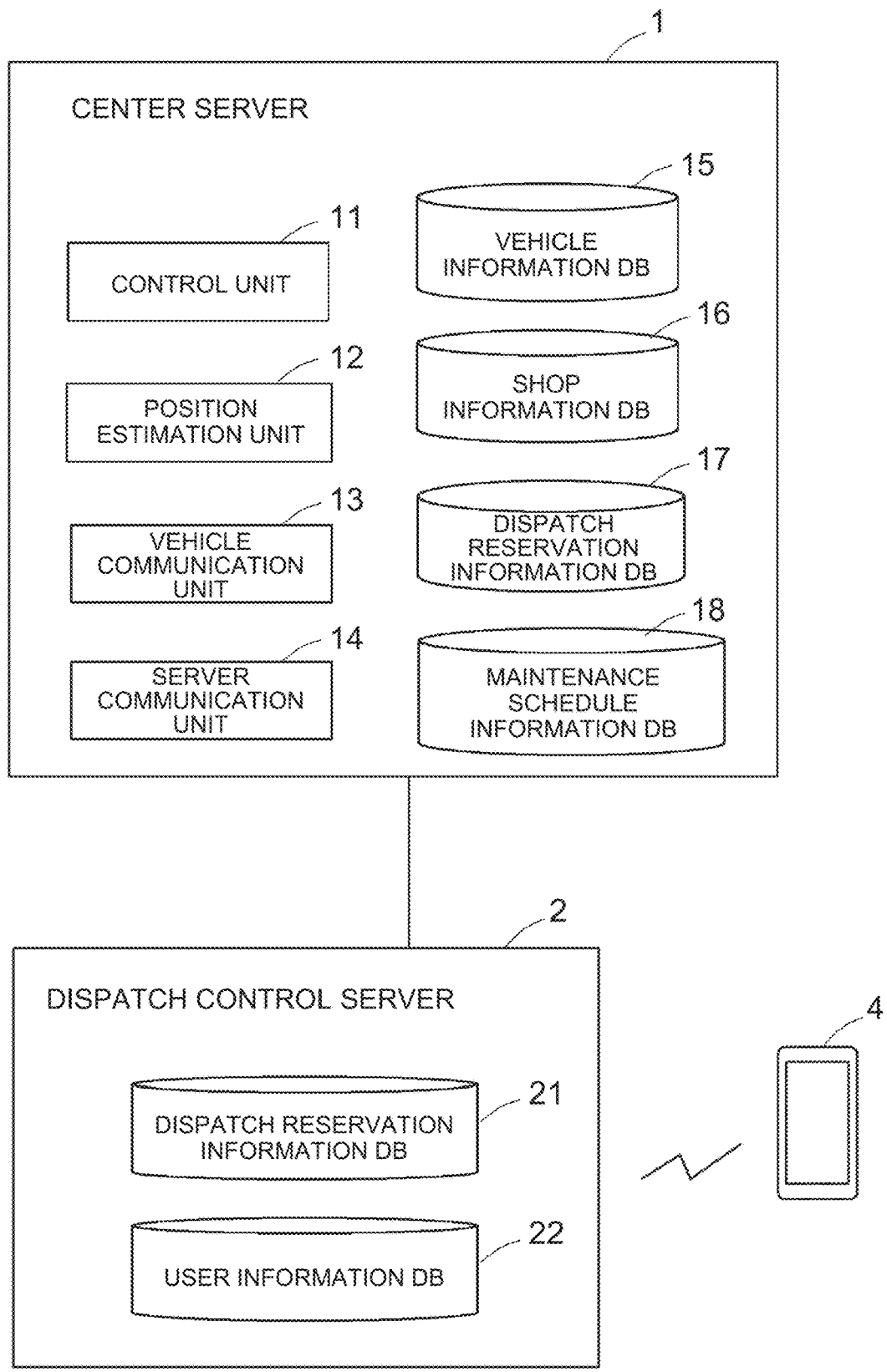
FIG. 3 is a diagram showing examples of the functional configurations of the center server and a dispatch control server.

FIG. 3 is a diagram showing examples of the functional configurations of the center server 1 and the dispatch control server 2. The center server 1 includes a control unit 11, a position estimation unit 12, a vehicle communication unit 13, a server communication unit 14, a vehicle information database (DB) 15, a shop information DB 16, a dispatch reservation information DB 17 and a maintenance schedule information DB 18, as functional configuration elements. For example, the functional configuration elements are achieved when the CPU 101 of the center server 1 executes the control program for the maintenance scheduling system 100.

The vehicle communication unit 13 is an interface for the communication with the in-vehicle device 5. For example, the vehicle communication unit 13 receives the traveling state information about the vehicle 50 from the in-vehicle device 5, with a predetermined period. For example, the traveling state information includes information about the vehicle 50, as exemplified by identification information, position information, traveling distance and information indicating the state of each component. The vehicle communication unit 13 outputs the received traveling state information to the control unit 11.

The server communication unit 14 is an interface for the communication with the dispatch control server 2 and the shop server 3. For example, the server communication unit 14 receives dispatch reservation information from the dispatch control server 2, and outputs the dispatch reservation information to the control unit 11. For example, the dispatch reservation information includes information indicating a planned getting-in date and hour and getting-in place about the dispatch reservation. For example, the server communication unit 14 receives the schedule information from the shop server 3, and outputs the schedule information to the control unit 11. For example, the schedule information from the shop server 3 includes information indicating a menu of the maintenance, a planned start date and hour and planned end date and hour about the maintenance, use equipment, identification information about a mechanic that performs the maintenance, and the like. For example, in accordance with an instruction from the control unit 11, the server communication unit 14 sends the schedule information about the maintenance of the vehicle 50, to the dispatch control server 2.

The position estimation unit 12 acquires an estimated value of the traveling position of the vehicle 50 on a date and hour designated by the control unit 11, in accordance with an instruction from the control unit 11. For example, the estimated value of the traveling position of the vehicle 50 may be acquired based on the traveling history information about the vehicle 50, or may be acquired using a model after learning or the like. For example, in the traveling history information about the vehicle 50, the position information included in the traveling state information received from the vehicle 50 is accumulated. The estimated traveling position about the vehicle 50 is output to the control unit 11.

The control unit 11 creates the schedule of the maintenance of the vehicle 50. Specifically, the control unit 11 determines whether the periodic garage entering or urgent garage entering is performed, based on the traveling state information about the vehicle 50. It is determined that the periodic garage entering and the urgent garage entering are performed, when a periodic garage entering condition and an urgent garage entering condition are satisfied, respectively. For example, the periodic garage entering condition is defined by the traveling distance. For example, the periodic garage entering condition is a condition that the traveling distance reaches a predetermined distance such as 10000 kilometers and 20000 kilometers, or a condition that the traveling distance reaches a distance of the predetermined distance$-\alpha$. For example, the urgent garage entering condition is a condition that the information included in the traveling state information and indicating the state of the component indicates the breakdown of a component or the abrasion of a component. The periodic garage entering condition and the urgent garage entering condition are not limited to them.

In the case where the periodic garage entering condition or urgent garage entering condition is satisfied about the vehicle 50, the control unit 11 first decides the planned maintenance date and hour. In the case of the periodic garage entering, for example, it is decided that the planned maintenance date and hour is a predetermined hour on a date after a predetermined number of days, as exemplified by a date after one week and a date after two weeks. Alternatively, for example, the planned maintenance date and hour in the case of the periodic garage entering may be set to a day of the week or an hour of the day when the vehicle 50 is less operated, based on the traveling history information about the vehicle 50 and the like. In the case of the urgent garage entering, the state of the vehicle 50 is determined based on the traveling state information, and the planned maintenance date and hour may be decided depending on the state of the vehicle 50. For example, in the case where the urgency is high, it may be decided that the planned maintenance date and hour is the current hour or an hour after a predetermined time from the current hour. For the urgent garage entering, for example, associating a menu of the maintenance and a time length before an hour to which the planned maintenance date and hour is set may be set in advance.

Next, the control unit 11 extracts a shop that the vehicle 50 can enter on the planned maintenance date and hour, as a candidate shop. The shop that the vehicle 50 can enter on the planned maintenance date and hour is a shop that is available on a date and hour around the planned maintenance date and hour, that includes equipment allowing the menu of the maintenance to be performed, and at which the vehicle 50 can arrive on the date and hour around the planned maintenance date and hour. For example, the date and hour around the planned maintenance date and hour is a date and hour that is included in the planned maintenance date and hour $\pm\alpha$. For example, $\alpha$ is an arbitrary time length of five minutes to one hour.

For example, the shop at which the vehicle 50 can arrive on the date and hour around the planned maintenance date and hour is a shop that is in a predetermined range set for the vehicle 50. For example, the predetermined range set for the vehicle 50 is a predetermined range on the basis of the address of the driver of the vehicle 50, a predetermined range on the basis of the traveling position of the vehicle 50 at a predetermined hour, or the like. For example, the predetermined range on the basis of the predetermined point such as the address of the driver and the traveling position of the vehicle 50 at the predetermined hour is a range of a predetermined distance from the predetermined point, the same area as the predetermined point, or the like. For example, the same area may be an area that is arbitrarily set by the maintenance scheduling system 100 in advance, or may be a city, a ward, a town or a village.

In the first embodiment, the center server 1 adopts the traveling position of the vehicle 50 at the predetermined hour, as the departure point in the schedule of the maintenance, and extract a shop at which the vehicle 50 can arrive around the planned maintenance date and hour, from the predetermined range on the basis of the traveling position. The departure point in the schedule of the maintenance differs between the periodic garage entering and the urgent garage entering. In the case of the periodic garage entering, for example, the departure point in the schedule of the maintenance is set to an estimated traveling position of the vehicle 50 at an hour that is a predetermined time before the planned maintenance date and hour. For example, the traveling position of the vehicle 50 is estimated about one hour before the planned maintenance date and hour. The estimated traveling position of the vehicle 50 is acquired from the position estimation unit 12. In the case of the urgent garage entering, the departure point in the schedule of the maintenance is set to the current position of the vehicle 50. The current position of the vehicle 50 is acquired as the position information included in the last traveling state information that is received from the in-vehicle device 5.

Next, the control unit 11 acquires demand prediction information relevant to the demand for the dispatch service that is predicted to be generated around the acquired candidate shop. For example, a temporal range in which the demand prediction information is acquired is arbitrarily set in a range of 24 hours from the planned maintenance date and hour by the hour. For example, a geographical range in which the demand prediction information about the dispatch service is acquired is arbitrarily set in a range of a predetermined distance from the candidate shop, in the same area as the candidate shop, or in other ranges. Further, the geographical range in which the demand prediction information about the dispatch service is acquired may be the same range as the range in which the candidate shop is extracted or may be a wider range including the range in which the candidate shop is extracted.

For example, the demand prediction information includes a place where the demand is predicted to be generated, a date and hour or an hour of the day when the demand is predicted to be generated, the kind of the demand, and the predicted value of the demand. Accordingly, in the first embodiment, the acquisition of the demand prediction information means the acquisition of the place where the demand is predicted to be generated and the acquisition of the predicted value of the demand at the place.

Examples of the demand for the dispatch service includes a reservation for the dispatch service, an event place where people gather, an unforeseen circumstance such as a bad weather, a delay of a public transit agency and a congestion, and a prediction from a past dispatch service history. The demand prediction information about the dispatch service is acquired from the dispatch control server 2 through the server communication unit 14, as reservation information about the dispatch service. For example, the demand prediction information such as the event, the weather, the delay of the public transit agency and the congestion is acquired by the control unit 11, based on prediction information that is relevant to the event, the weather, the delay of the public transit agency, the congestion and the like and that is collected from the web. For example, the demand prediction information about the past dispatch service history is acquired by the control unit 11, based on past reservation information about the dispatch service that is acquired from the dispatch control server 2. As a method by which the control unit 11 acquires the demand prediction information from predetermined information, for example, any method of well-known technologies such as a method using a learning model and a method using a statistical technique may be used. The place where the demand for the dispatch service is predicted to be generated sometimes include the shop where the maintenance of the vehicle is performed.

In the case of the demand prediction information about the dispatch service, the place where the demand is predicted to be generated and the date and hour or the hour of the day when the demand is predicted to be generated are a getting-in place in the reservation for the dispatch service and a planned getting-in date and hour designated by the user, respectively. In the case of the demand prediction information about the event, for example, the place where the demand is predicted to be generated and the date and hour or the hour of the day when the demand is predicted to be generated are a place where the event is carried out and a date and hour when the event ends, respectively. Further, in the case of the demand prediction information about the event, for example, the place where the demand is predicted to be generated and the date and hour or the hour of the day when the demand is predicted to be generated are a station around a place where the event is carried out and a date and hour when the event starts, respectively. In the case of the demand prediction information about the unforeseen circumstance such as the weather, the delay of the public transit agency and the congestion, the place where the demand is predicted to be generated and the date and hour or the hour of the day when the demand is predicted to be generated are a place where the unforeseen circumstance is predicted to be generated and a date and hour or an hour of the day when the unforeseen circumstance is predicted to be generated, respectively. In the case of the demand prediction information about the past dispatch service history, the place where the demand is predicted to be generated and the date and hour or the hour of the day when the demand is predicted to be generated are a place where the demand is predicted to be generated from the past dispatch service history and a date and hour or an hour of the day when the demand is predicted to be generated from the past dispatch service history, respectively.

For the kind of the demand, a priority is set. For example, a priority order is given so as to satisfy "a reservation for the dispatch service in which the driver of the vehicle 50 is designated">"a reservation for the dispatch service in which the driver is not designated">"an event place where people gather">"a past dispatch service history">"a station of a railroad when the unforeseen circumstance is predicted to be generated". However, the order of the priority of the kind of the demand is not limited to this.

For example, the predicted value of the demand that is included in the demand prediction information is acquired based on the kind of the demand, the number of users that are expected to request the dispatch service and the number of vehicles that are requested in the dispatch service. Among places different in the kind of the demand, as the priority of the kind of the demand is higher, a higher value is acquired as the predicted value of the demand, and among places having the same kind of the demand, as the number of expected users or the number of expected vehicles is larger, a higher value is acquired as the predicted value of the demand. For example, a higher value than the predicted value of the demand about the event is acquired as the predicted value of the demand about the reservation for the dispatch service, regardless of the number of users that are expected to request the dispatch service at the event place where people gather. For example, in comparison between an event A and an event B, in the case where the number of users that are expected to request the dispatch service in the event A is larger, a higher value is acquired as the predicted value of the demand about the event A. The method for acquiring the predicted value of the demand is not limited to this.

Next, the control unit 11 extracts a place for which the predicted value of the demand is equal to or higher than a predetermined threshold, from acquired places where the demand is predicted to be generated. The place for which the predicted value of the demand for the dispatch service is equal to or higher than the predetermined threshold means a place where the demand for the dispatch service becomes high.

Next, the control unit 11 decides the destination from extracted places, for example, in an order from a place for which the predicted value of the demand is highest or in an order from a place for which the distance from the candidate shop is shortest. In the case where the destination is not decided based on any of the predicted value and the distance from the candidate shop, the control unit 11 decides that the destination is a place for which a total time length from the departure from the departure point in the schedule of the maintenance to the arrival at the place where the demand is predicted to be generated from the candidate shop after the maintenance at the candidate shop is shortest. The total time length is referred to as a total downtime.

In the case where there is no place for which the predicted value for the demand is equal to or higher than the predetermined threshold, the control unit 11 decides the destination from the acquired places where the demand is predicted to be generated, in an order from a place for which the distance from the candidate shop is shortest and in an order from a place for which the total downtime is shortest. In the case where the destination is not decided based on any of the predicted value of the demand, the distance from the candidate shop and the total downtime, for example, the control unit 11 decides that there is no destination.

Next, the control unit 11 decides that the shop where the maintenance of the vehicle 50 is performed is a candidate shop that is closest to the destination. Thereafter, for example, the control unit 11 arranges a planned hour of the departure, a planned hour of the arrival at the shop, an hour of the departure from the shop to the destination, and the like, creates maintenance schedule information about the vehicle 50, and sends the maintenance schedule information to the dispatch control server 2. The dispatch control server 2 sends the maintenance schedule information to the user terminal 4 of the driver of the vehicle 50. Further, the control unit 11 reserves the maintenance of the vehicle 50 to the shop server 3 of the shop.

Further, for the schedule of the maintenance of the vehicle 50, the control unit 11 performs a schedule managing process of encouraging the shop server 3 to arrange the implementation order of the maintenance of the vehicle 50 in the shop, depending on the change in the demand for the dispatch service. Since the demand for the dispatch service is a predicted demand, there is a possibility that the demand changes as time passes. Examples of the change in the demand for the dispatch service include a change in the place where the demand is predicted to be generated, a change in the date and hour when the demand is predicted to be generated, a change in the predicted date and hour, and a change in the predicted value of the demand. The control unit 11 gives, to the shop server 3, a notice of the alteration of the priority of the implementation order of the maintenance of the vehicle 50, such that the vehicle 50 arrives at a place where the demand after the change becomes high by a date and hour when the demand becomes high. The shop server 3 receives the notice from the control unit 11, and in the case where there is spare time in the schedule, the shop server 3 alters the priority of the implementation order of the maintenance of the vehicle 50, and alters the implementation order of the maintenance of the vehicle 50 based on the priority.

The vehicle information DB 15, the shop information DB 16, the dispatch reservation information DB 17 and the maintenance schedule information DB 18 are created in the external storage device 103 of the center server 1. The vehicle information DB 15 holds vehicle information relevant to the vehicle. The shop information DB 16 holds shop information relevant to the shop. The dispatch reservation information DB 17 holds the dispatch reservation information that is acquired from the dispatch control server 2. The maintenance schedule information DB 18 holds the maintenance schedule information created by the control unit 11. Details of the information held in the respective databases will be described later.

The dispatch control server 2 includes a dispatch reservation information DB 21 and a user information DB 22. The dispatch reservation information DB 21 and the user information DB 22 are created in a storage region of the external storage device of the dispatch control server 2. The dispatch reservation information DB 21 holds the dispatch reservation information. The user information DB 22 holds user information relevant to the user that is registered in the dispatch service. The user information includes identification information about the user, information indicating whether the user is registered as the driver, information relevant to the vehicle 50 that is used in the case where the user is registered as the driver, and the like. The information relevant to the vehicle 50 that is used includes identification information about the vehicle 50, the type of the vehicle 50, the color of a vehicle body, the number of persons that can ride in the vehicle 50, and the like. For example, the identification information about the vehicle 50 may be information described on a number plate, or terminal identification information about the in-vehicle device 5.

Each of the functional configurations of the center server 1 and the dispatch control server 2 may be achieved by the cooperation of a plurality of information processing devices, without being limited to the achievement by a single information processing device. Alternatively, a single information processing device may execute the processes of the center server 1 and the dispatch control server 2.

FIG. 4 is an example of the information that is held in the vehicle information DB 15. The vehicle information DB 15 holds the information relevant to the vehicle that is managed by the center server 1. For example, each record of the vehicle information DB 15 includes fields of vehicle ID, vehicle type, model code, dispatch service, position information, traveling distance and the like.

The vehicle ID field contains the identification information about the vehicle. The vehicle type field contains the information indicating the type of the vehicle. For example, the vehicle type may be the brand name, the series name or the like of the vehicle, or may be information indicating the kind of the vehicle, as exemplified by a sedan and a wagon. The model code field contains identification information indicating a model code written on a vehicle inspection certificate of the vehicle. The values of the vehicle ID field, the vehicle type field and the model code field are set in advance.

The dispatch service field contains information indicating whether the vehicle is a vehicle that is used for the dispatch service. For example, the information indicating whether the vehicle is a vehicle that is used for the dispatch service is shown by a flag or a code. For example, the information indicating whether the vehicle is used for the dispatch service can be acquired from the dispatch control server 2. In the first embodiment, the vehicle that is used for the dispatch service is the vehicle 50.

The position information field contains the position information about the vehicle. For example, the position information is shown by latitude and longitude. The traveling distance field contains the traveling distance about the vehicle. The values of the position information field and the traveling distance field are acquired from the traveling state information that is periodically received from the vehicle. When the traveling state information is received from the vehicle, the position information field and traveling distance field for the corresponding vehicle are updated to values included in the traveling state information, by the control unit 11.

The information contained in the vehicle information DB 15 is not limited to the information shown in FIG. 4. As the information relevant to the vehicle, information other than the identification information, vehicle type and model code about the vehicle may be contained in the vehicle information DB 15. Further, as the traveling state information about the vehicle, information other than the position information and the traveling distance may be contained in the vehicle information DB 15.

FIG. 5 is an example of the information that is held in the shop information DB 16. In the shop information DB 16, information relevant to the shop is held. For example, each record of the shop information DB 16 includes fields of shop ID, position, equipment, menu ID, schedule information and maintenance history information.

The shop ID field contains identification information about the shop. The position field contains position information about the shop. For example, the position information about the shop that is contained in the position field is shown by latitude and longitude or by an address. The equipment field contains information indicating maintenance equipment that is included in the shop. The menu ID field contains identification information about a menu of the maintenance that can be performed in the shop.

The schedule information field contains the schedule information about the maintenance that is reserved at the shop. The schedule information includes the identification information about the vehicle to which the maintenance is performed, the identification information about a menu of the maintenance that is planned to be performed, identification information about a mechanic that performs the maintenance, a date and hour when the maintenance is planned to be performed, and information indicating equipment that is planned to be used, for each schedule. For example, the date and hour when the maintenance is planned to be performed includes a planned start hour and a planned end hour.

The maintenance history information field contains history information about the maintenance performed in the shop. For example, the maintenance history information includes the identification information about the vehicle to which the maintenance was performed, the identification information about a menu of the maintenance that was performed, the identification information about a mechanic that performed the maintenance, a date and hour when the maintenance was performed, and information indicating equipment that was used, for each schedule.

For example, the equipment field, the schedule information field and the maintenance history information field may contain information indicating maintenance equipment, the schedule information and the address of a storage region in which the maintenance history information is contained, respectively.

For example, the control unit 11 periodically receives the schedule information and the maintenance history information from each shop server 3, at a predetermined timing, and updates the schedule information field and maintenance history information field of the shop information DB 16. For example, the timing when the schedule information and the maintenance history information are sent from each shop server 3 is a predetermined hour of every day, or a timing when the schedule of the maintenance is completed. The information contained in the shop information DB 16 is not limited to the information shown in FIG. 5.

FIG. 6 is an example of a maintenance menu table. The maintenance menu table is a table that holds information relevant to each menu of the maintenance. For example, the maintenance menu table is held in the shop information DB 16.

The maintenance menu table includes fields of menu ID, content and required time. The menu ID field contains the identification information about the menu of the maintenance. The content field contains information indicating a maintenance content about the menu. The required time field contains a roughly expected time required for the maintenance about the menu.

The maintenance menu table is prepared in advance. For example, the actual maintenance is performed by combining maintenance menus depending on the state of the vehicle. For example, the maintenance menu table is referred to when the total downtime is acquired or when the schedule information about the maintenance is created. The maintenance menu table shown in FIG. 6 is an example, and the maintenance menu table is not limited to this.

FIG. 7 is an example of information that is held in the dispatch reservation information DB 17. In the dispatch reservation information DB 17, the dispatch reservation information is held. One record of the dispatch reservation information DB 17 corresponds to one dispatch service. Each record of the dispatch reservation information DB 17 includes fields of reservation ID, planned getting-in date and hour, getting-in place, planned arrival date and hour, getting-off place, designation and vehicle ID.

The reservation ID field contains identification information about the dispatch reservation. The planned getting-in date and hour field and the planed arrival date and hour field contain a date and hour when the passenger is planned to get in the vehicle and a date and hour when the passenger is planned to get off the vehicle, respectively. The getting-in place field and the getting-off place field contain information indicating a getting-in place designated by the passenger and information indicating a getting-off place designated by the passenger, respectively. For example, the information indicating the getting-in place and the getting-off place is shown by latitude and longitude, by an address or by a building name. The getting-in place is one of the destinations in the maintenance schedule for the vehicle 50.

The designation field contains information indicating whether the passenger has designated the driver. For example, the information indicating whether the passenger has designated the driver is shown by a flag. The vehicle ID field contains the identification information about the vehicle that is used by the driver designated by the passenger. In the case where the value of the designation field indicates that the passenger has designated the driver, a value is contained in the vehicle ID field. In the case where the value of the designation field indicates that the passenger has not designated the driver, the vehicle ID field is empty.

For example, the dispatch reservation information is acquired from the dispatch control server 2 at a predetermined timing, and is updated by the control unit 11. For example, the dispatch reservation information is acquired with a predetermined period or when the maintenance schedule information about the vehicle is created. The information that is contained in the dispatch reservation information DB 17 is not limited to the information shown in FIG. 7.

FIG. 8 is an example of information that is held in the maintenance schedule information DB 18. In the maintenance schedule information DB 18, the maintenance schedule information about the vehicle 50 is held. One record of the maintenance schedule information DB 18 corresponds to the schedule that is created by the control unit 11 for one maintenance for the vehicle 50. Each record of the maintenance schedule information DB 18 includes fields of schedule ID, vehicle ID, shop ID, planned garage entering date and hour, planned garage leaving date and hour, menu content, destination and planned arrival date and hour.

The schedule ID field contains identification information about the schedule. The vehicle ID field contains the identification information about the vehicle 50 to which the maintenance is performed. The shop ID field contains the identification information about the shop at which the maintenance of the vehicle 50 is reserved. The planned garage entering date and hour field and the planned garage leaving date and hour field contain a date and hour when the vehicle 50 is planned to arrive at the shop and a date and hour when the vehicle 50 is planned to depart from the shop, respectively. The menu content field contains information indicating the menu of the maintenance that is planned to be performed.

The destination field contains information indicating the destination in the schedule. For example, the information indicating the destination in the schedule is shown by latitude and longitude, by an address or by a building name. The planned arrival date and hour field contains a date and hour when the vehicle 50 is planned to arrive at the destination.

For example, the maintenance schedule information is created by the control unit 11, and is registered in the maintenance schedule information DB 18. When the schedule of the maintenance is performed and completed, the schedule of the maintenance is deleted from the maintenance schedule information DB 18 by the control unit 11. For example, a notice of the completion of the schedule of the maintenance is given from the shop server 3. The information contained in the maintenance schedule information DB 18 is not limited to the information shown in FIG. 8.

Processing Flow

Figure 9:
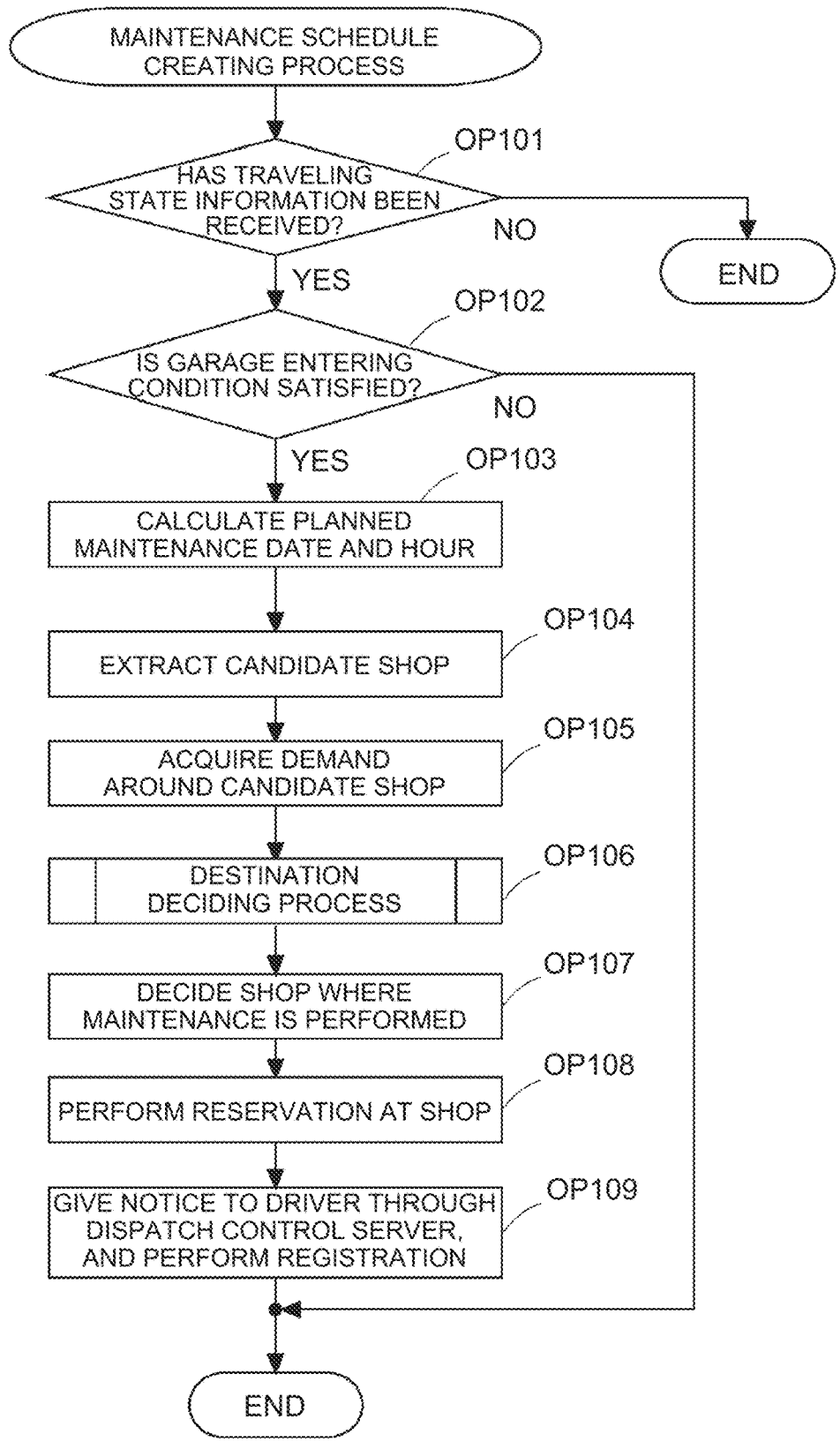
FIG. 9 is an example of a flowchart of a maintenance schedule creating process in the center server.

FIG. 9 is an example of a flowchart of a maintenance schedule creating process in the center server 1. The process shown in FIG. 9 is repeatedly executed with a predetermined period. The subject that executes the process shown in FIG. 9 is the CPU 101 of the center server 1, but for the sake of convenience, the description will be made while the functional configuration element is regarded as the subject. The same goes for flowcharts described later.

In OP101, the control unit 11 determines whether the traveling state information has been received from the vehicle 50 through the vehicle communication unit 13. In the case where the traveling state information has been received from the vehicle 50 (OP101; YES), the process proceeds to OP102. In the case where the traveling state information has not been received from the vehicle 50 (OP101: NO), the process shown in FIG. 9 ends.

In OP102, the control unit 11 determines whether one of the periodic garage entering condition and the urgent garage entering condition is satisfied, based on the traveling state information about the vehicle 50 received in OP101. In the case where the garage entering condition is satisfied (OP102: YES), the process proceeds to OP103. In the case where the garage entering condition is not satisfied (OP102: NO), the process shown in FIG. 9 ends.

In OP103, the control unit 11 calculates the planned maintenance date and hour for the periodic garage entering or the urgent garage entering. In the case of the periodic garage entering, for example, the control unit 11 sets the planned maintenance date and hour to a predetermined hour on a date after a predetermined number of days. In the case of the periodic garage entering, for example, the control unit 11 sets the planned maintenance date and hour to an hour after a predetermined time from the current hour.

In OP104, the control unit 11 extracts the candidate shop that the vehicle 50 can enter on the planned maintenance date and hour. In the first embodiment, the candidate shop is a shop that is available around the planned maintenance date and hour, that includes equipment allowing the menu of the maintenance to be performed, and that is in a range of a predetermined distance from the departure point of the vehicle 50. In the case of the periodic garage entering, the departure point of the vehicle 50 is set to the estimated traveling position of the vehicle 50 at an hour that is a predetermined time before the planned maintenance date and hour. The control unit 11 acquires the estimated traveling position of the vehicle 50 from the position estimation unit 12. In the case of the urgent garage entering, the departure point in the schedule of the maintenance is set to the current position of the vehicle 50. The current position of the vehicle 50 is a position indicated by the position information that is included in the traveling state information received in OP101.

By referring to the shop information DB 16, the control unit 11 extracts the candidate shop that is available around the planned maintenance date and hour, that includes the equipment allowing the menu of the maintenance to be performed, and that is in the range of the predetermined distance from the departure point of the vehicle 50. In some cases, a plurality of candidate shops is extracted.

In OP105, the control unit 11 acquires a place that is around the candidate shop and where the demand for the dispatch service is predicted to be generated. In the case where there is a plurality of candidate shops, the control unit 11 acquires, for each of the candidate shops, a place that is around the candidate shop and where the demand for the dispatch service is predicted to be generated. In OP 105, the control unit 11 receives the demand prediction information about each place.

In OP106, the control unit 11 executes a destination deciding process of deciding the destination in the schedule of the maintenance, based on the demand prediction information about each place where the demand is predicted to be generated. Details of the destination deciding process will be described later. By the destination deciding process in OP106, the destination in the schedule of the maintenance is decided from places where the demand is predicted to be generated.

In OP107, the control unit 11 decides a shop that is closest to the destination among the candidate shops, as the shop where the maintenance of the vehicle 50 is performed. In OP108, the control unit 11 reserves the maintenance of the vehicle 50, by sending a reservation request to the shop server 3 of the shop decided as the shop where the maintenance of the vehicle 50 is performed. The shop server 3 receives the reservation request, and then registers the reservation for the maintenance of the vehicle 50 in the schedule.

In OP109, the control unit 11 sends the created maintenance schedule information to the dispatch control server 2 through the server communication unit 14, and registers the created maintenance schedule information in the maintenance schedule information DB 18. The dispatch control server 2 receives the maintenance schedule information from the center server 1, and then gives a notice of the maintenance schedule information to the user terminal 4 of the driver of the vehicle 50. Thereafter, the process shown in FIG. 9 ends.

Figure 10:
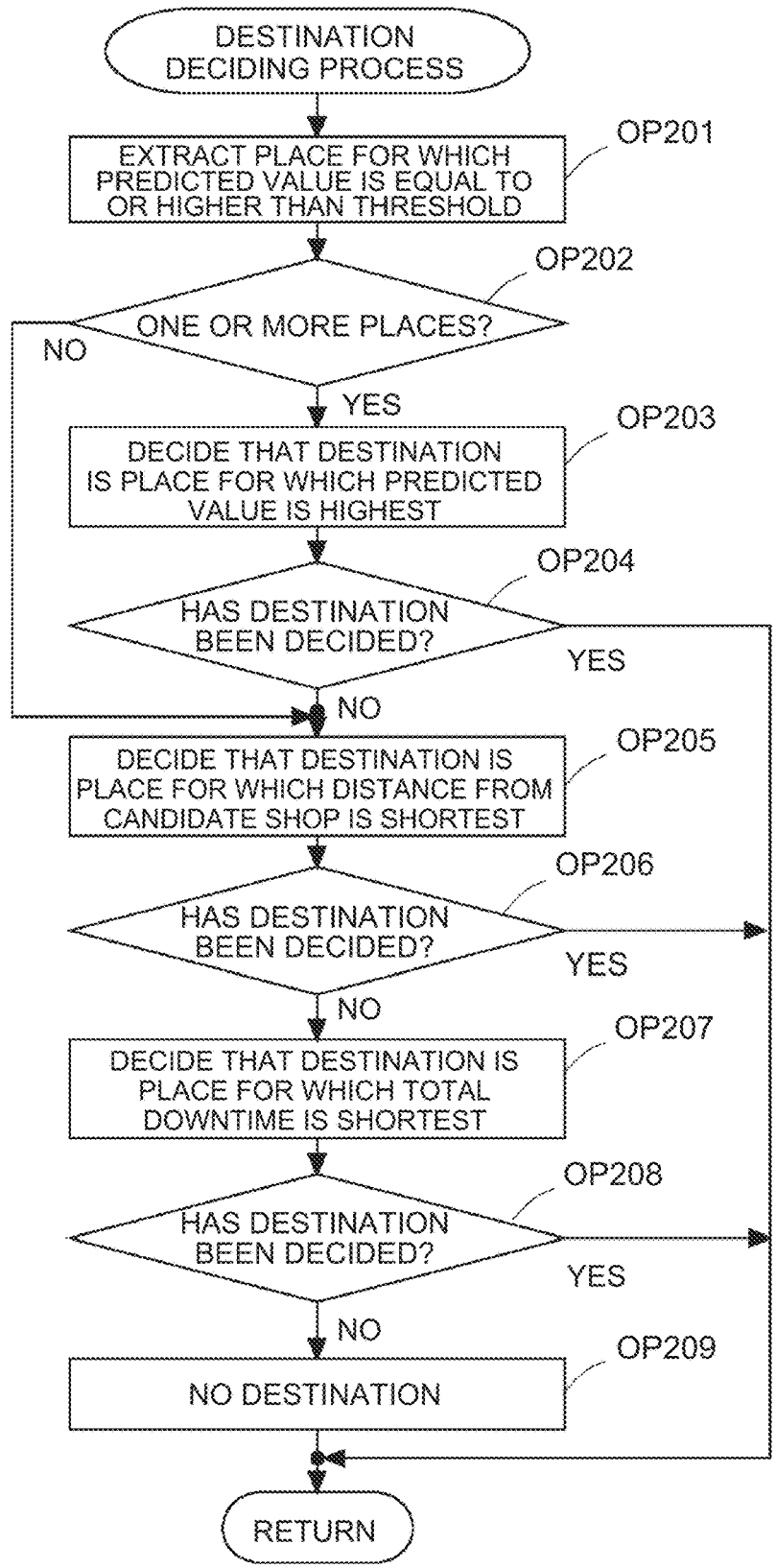
FIG. 10 is an example of a flowchart of a destination deciding process in the center server.

FIG. 10 is an example of a flowchart of a destination deciding process in the center server 1. The process shown in FIG. 10 is a process corresponding to the process in OP106 of FIG. 9. In OP201, the control unit 11 extracts a place for which the predicted value of the demand is equal to or higher than a predetermined threshold, from places that are acquired in OP105 of FIG. 9 and where the demand for the dispatch service around the candidate shop is predicted to be generated.

In OP202, the control unit 11 determines whether one or more places have been obtained as the result of the extraction in OP201. In the case where one or more places have been obtained as the result of the extraction in OP201 (OP202: YES), the process proceeds to OP203. In the case where no place has been obtained as the result of the extraction in OP201 (OP202: NO), the process proceeds to OP205.

In OP203, the control unit 11 decides that the destination in the schedule of the maintenance of the vehicle 50 is a place for which the predicted value of the demand is highest among the places obtained as the result of the extraction in OP201. In the case where there is a plurality of places as the place for which the predicted value of the demand is highest, the destination is not decided. In OP204, the control unit 11 determines whether the destination in the schedule of the maintenance of the vehicle 50 has been decided. In the case where the destination in the schedule of the maintenance of the vehicle 50 has been decided (OP204: YES), the process shown in FIG. 10 ends, and the process proceeds to OP107 of FIG. 9. In the case where the destination in the schedule of the maintenance of the vehicle 50 has not been decided (OP204: NO), the process proceeds to OP205.

In OP205, the control unit 11 decides that the destination in the schedule of the maintenance of the vehicle 50 is a place for which the distance from the candidate shop is shortest among the places obtained as the result of the extraction in OP201 or among the places that are acquired in OP105 of FIG. 9 and where the demand is predicted to be generated. In the case where there is a plurality of places as the place for which the distance from the candidate shop is shortest, the destination is not decided. In OP206, the control unit 11 determines whether the destination in the schedule of the maintenance of the vehicle 50 has been decided. In the case where the destination in the schedule of the maintenance of the vehicle 50 has been decided (OP206: YES), the process shown in FIG. 10 ends, and the process proceeds to OP107 in FIG. 9. In the case where the destination in the schedule of the maintenance of the vehicle 50 has not been decided (OP206: NO), the process proceeds to OP207.

In OP207, the control unit 11 decides that the destination in the schedule of the maintenance of the vehicle 50 is a place for which the total downtime is shortest among the places obtained as the result of the extraction in OP201 or among the places that are acquired in OP105 of FIG. 9 and where the demand is predicted to be generated. In the case where there is a plurality of places as the place for which the total downtime is shortest, the destination is not decided. In OP208, the control unit 11 determines whether the destination in the schedule of the maintenance of the vehicle 50 has been decided. In the case where the destination in the schedule of the maintenance of the vehicle 50 has been decided (OP208: YES), the process shown in FIG. 10 ends, and the process proceeds to OP107 in FIG. 9. In the case where the destination in the schedule of the maintenance of the vehicle 50 has not been decided (OP208: NO), the process proceeds to OP209.

In OP209, since the destination in the schedule of the maintenance of the vehicle 50 is not decided using any of the predicted value of the demand, the distance from the shop and the total downtime, the control unit 11 sets non-destination. Thereafter, the process shown in FIG. 10 ends, and the process proceeds to OP107 in FIG. 9. In the case where the destination in the schedule of the maintenance of the vehicle 50 has not been decided, the shop where the maintenance of the vehicle 50 is performed may be randomly decided from the candidate shops, or it may be decided that the shop where the maintenance of the vehicle 50 is performed is a shop that is closest to the departure point of the vehicle 50, in OP107 of FIG. 9.

The maintenance schedule creating process shown in FIG. 9 and FIG. 10 is an example, and can be altered depending on the implementation manner, when appropriate. For example, in the destination deciding process, the priority order of elements for deciding the destination may satisfy "the distance from the shop">"the level of the predicted value of the demand">"the length of the total downtime". Further, at least one of the distance from the shop, the level of the predicted value of the demand and the length of the total downtime may be used as the element for deciding the destination in the destination deciding process.

Figure 11:
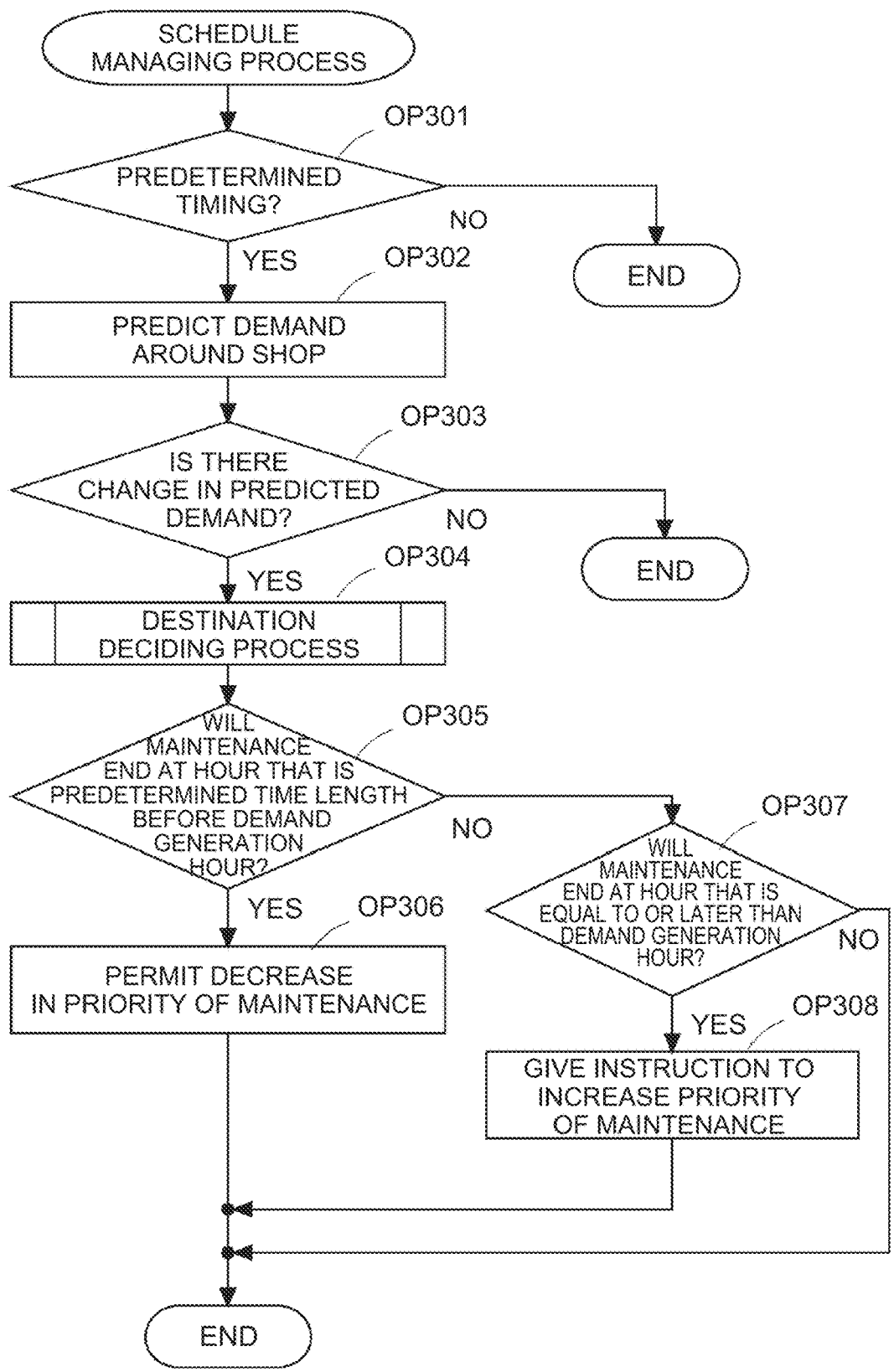
FIG. 11 is an example of a flowchart of a schedule managing process in the center server.

FIG. 11 is an example of a flowchart of a schedule managing process of the center server 1. The schedule managing process is a process of arranging the priority of the implementation of the maintenance about the schedule of the maintenance of the vehicle 50 that is generated by the center server 1, depending on the change in the demand. The process shown in FIG. 11 is repeatedly executed with a predetermined period. Further, the process shown in FIG. 11 is executed for each piece of the maintenance schedule information held in the maintenance schedule information DB 18.

In OP301, the control unit 11 determines whether the current timing is a predetermined timing. For example, the predetermined timing in OP301 is an hour that is a predetermined time before the planned garage entering date and hour in the target maintenance schedule information held in the maintenance schedule information DB 18.

In the case of the predetermined timing (OP301: YES), the process proceeds to OP302. In the case of being not the predetermined timing (OP301: NO), the process shown in FIG. 11 ends.

In OP302, the control unit 11 acquires the demand prediction information by predicting the demand for the dispatch service around the shop in the target maintenance schedule information at an hour of the day around the planned garage entering date and hour in the target maintenance schedule information. In OP303, the control unit 11 determines whether there is a change in the predicted demand. For example, in the case where the demand prediction information acquired in OP302 has demand prediction information including a place where the demand is predicted to be generated and that coincides with the destination in the target maintenance schedule information and a date and hour when the demand is predicted to be generated and that coincides with the planned arrival date and hour in the target maintenance schedule information, the control unit 11 determines that there is no change in the demand. For example, in the case where the demand prediction information acquired in OP302 does not have the demand prediction information including a place where the demand is predicted to be generated and that coincides with the destination in the target maintenance schedule information and a date and hour when the demand is predicted to be generated and that coincides with the planned arrival date and hour in the target maintenance schedule information, the control unit 11 determines that there is a change in the demand.

In the case where there is a change in the predicted demand (OP303: YES), the process proceeds to OP304. In the case where there is no change in the predicted demand (OP303: NO), the process shown in FIG. 11 ends without the alteration of the schedule of the maintenance of the vehicle 50.

In OP304, the control unit 11 performs the destination deciding process based on the demand prediction information that is acquired in OP302 and that is relevant to the demand for the dispatch service around the shop in the target maintenance schedule information, and decides a new destination. The destination deciding process is shown in FIG. 10.

In OP305, the control unit 11 determines whether the planned garage leaving date and hour in the target maintenance schedule information is earlier, by a predetermined time length or more, than the hour when the demand is predicted to be generated at the new destination. In the case where the planned garage leaving date and hour in the target maintenance schedule information is earlier, by the predetermined time length or more, than the hour when the demand is predicted to be generated at the new destination (OP305: YES), the process proceeds to OP306. In the case where the planned garage leaving date and hour in the target maintenance schedule information is not earlier, by the predetermined time length or more, than the hour when the demand is predicted to be generated at the new destination (OP305: NO), the process proceeds to OP307.

In OP306, the control unit 11 sends a notice of permission to decrease the priority of the implementation order of the maintenance of the vehicle 50, to the shop server 3 of the shop in the target maintenance schedule information. Thereafter, the process shown in FIG. 11 ends. The shop server 3 of the shop receives the notice, and then decreases the priority of the implementation order of the maintenance of the vehicle 50. At this time, in the case where there is a reservation of the maintenance of a different vehicle having a higher priority than the vehicle 50 around the hour of the reservation of the maintenance of the vehicle 50 in the shop, the shop server 3 performs the arrangement of the schedule, to execute the maintenance of the different vehicle earlier, for example.

The shop server 3 performs the arrangement such that the vehicle 50 arrives at the new destination by the date and hour when the demand is predicted to be generated at the new destination, even when the implementation order of the maintenance of the vehicle 50 is altered. Even when the shop server 3 receives the notice of the permission to decrease the priority of the implementation order of the maintenance of the vehicle 50, the shop server 3 can avoid the decrease in the priority of the implementation order of the maintenance of the vehicle 50. For example, in the case where the reservation for the maintenance of a different vehicle is not set around the hour of the maintenance of the vehicle 50, the shop server 3 does not decrease the priority of the implementation order of the maintenance of the vehicle 50.

In OP307, the control unit 11 determines whether the planned garage leaving date and hour in the target maintenance schedule information is an hour that is equal to or later than the hour when the demand is predicted to be generated at the new destination. In the case where the planned garage leaving date and hour in the target maintenance schedule information is an hour that is equal to or later than the hour when the demand is predicted to be generated at the new destination (OP307: YES), the process proceeds to OP308. In the case where the planned garage leaving date and hour in the target maintenance schedule information is not an hour that is equal to or later than the hour when the demand is predicted to be generated at the new destination (OP307: NO), the process shown in FIG. 11 ends.

In OP308, the control unit 11 sends a notice of an instruction to increase the priority of the implementation order of the maintenance of the vehicle 50, to the shop server 3 of the shop in the target maintenance schedule information. Thereafter, the process shown in FIG. 11 ends. The shop server 3 of the shop receives the notice, and then increases the priority of the implementation order of the maintenance of the vehicle 50. At this time, in the case where there is a reservation of the maintenance of a different vehicle having a lower priority than the vehicle 50 around the hour of the reservation of the maintenance of the vehicle in the shop, the shop server 3 performs the arrangement of the schedule such that the maintenance of the vehicle 50 is executed in preference to the maintenance of the different vehicle. Thereby, it is possible to arrange the implementation order of the maintenance such that the vehicle 50 arrives at the new destination by the date and hour when the demand is predicted to be generated at the new destination. The schedule managing process is not limited to the process shown in FIG. 11, and can be altered depending on the implementation manner, when appropriate.

Function Effect of First Embodiment

With the first embodiment, the center server 1 sets the shop for the maintenance of the vehicle 50 that is used for the dispatch service, to a shop close to the point where the demand for the dispatch service is predicted to be generated. Thereby, after the end of the maintenance, the vehicle 50 can get a passenger earlier, so that it is possible to reduce the loss of the business opportunity. Further, by setting the shop for the maintenance of the vehicle 50 to a shop close to a point where the demand is higher, that is, a point where the value indicating the demand is higher, it is possible to improve the possibility that the vehicle 50 gets a passenger after the end of the maintenance.

Further, after the reservation of the maintenance of the vehicle 50 at the shop, the center server 1 causes the shop to arrange the priority of the implementation order of the maintenance of the vehicle 50, depending on the change in the demand around the shop. Thereby, for example, in the shop, in the case where there is spare time before the date and hour when the demand for the dispatch service after the change is generated, it is possible to perform the maintenance of a different vehicle having a higher priority in preference to the maintenance of the vehicle 50, and to efficiently perform the maintenance. Further, in the case where the implementation order of the vehicle 50 is altered depending on the change in the demand, the garage leaving date and hour of the vehicle 50 is also arranged such that the vehicle 50 arrives by the date and hour when the demand is predicted to be generated or such that the waiting time becomes short. For example, when the waiting time after the maintenance of the vehicle 50 ends and before the passenger is got is too long, there is fear that the driver of the vehicle 50 avoids the maintenance itself. With the first embodiment, the shop for the maintenance is selected or the implementation order is arranged such that the waiting time after the end of the maintenance of the vehicle 50 becomes shorter, and therefore it is possible to restrain the driver of the vehicle 50 from avoiding the maintenance of the vehicle 50.

Second Embodiment

In the first embodiment, the vehicle 50 is a vehicle that includes the in-vehicle device 5 having a communication function and that travels while being driven by the driver. In a second embodiment, the scheduling of the maintenance of an automatic driving vehicle is performed instead of the vehicle 50. In the second embodiment, the same descriptions as those in the first embodiment are omitted.

Figure 12:
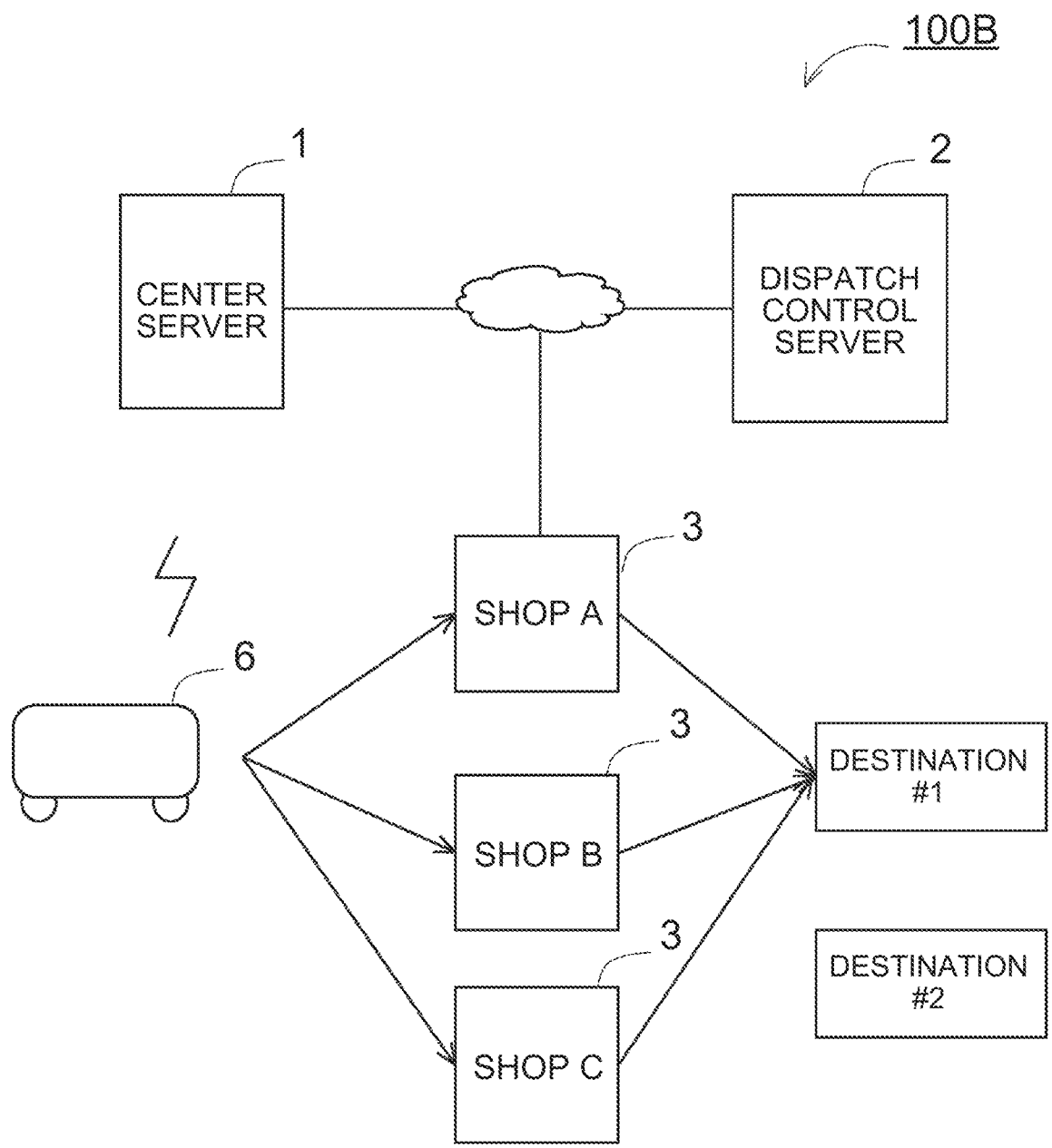
FIG. 12 is a diagram showing an example of the system configuration of a maintenance scheduling system according to a second embodiment.

FIG. 12 is a diagram showing an example of the system configuration of a maintenance scheduling system 100B according to the second embodiment. The maintenance scheduling system 100B includes the center server 1, the dispatch control server 2, the shop server 3 and a vehicle 6. The vehicle 6 is an automatic driving vehicle that can perform driverless traveling, and includes a control device that can execute the same process as the process by the in-vehicle device 5 in the first embodiment.

In the second embodiment, the vehicle 6 sends the traveling state information to the center server 1. In the second embodiment, the vehicle 6 itself communicates with the dispatch control server 2, and the dispatch control server 2 sends the maintenance schedule information about the vehicle 6 that is created by the center server 1, to the vehicle 6. In the process by the center server 1, which is the same as that in the first embodiment, the determination about the garage entering of the vehicle 6 is performed based on the traveling state information from the vehicle 6, a shop close to the place where the demand for the dispatch service is predicted to be generated is selected as the shop where the maintenance of the vehicle 6 is performed, and the maintenance schedule information is created. Accordingly, with the second embodiment, also for the maintenance of the automatic driving vehicle, it is possible to create the schedule such that the loss of the business opportunity is reduced.

Third Embodiment

Figure 13:
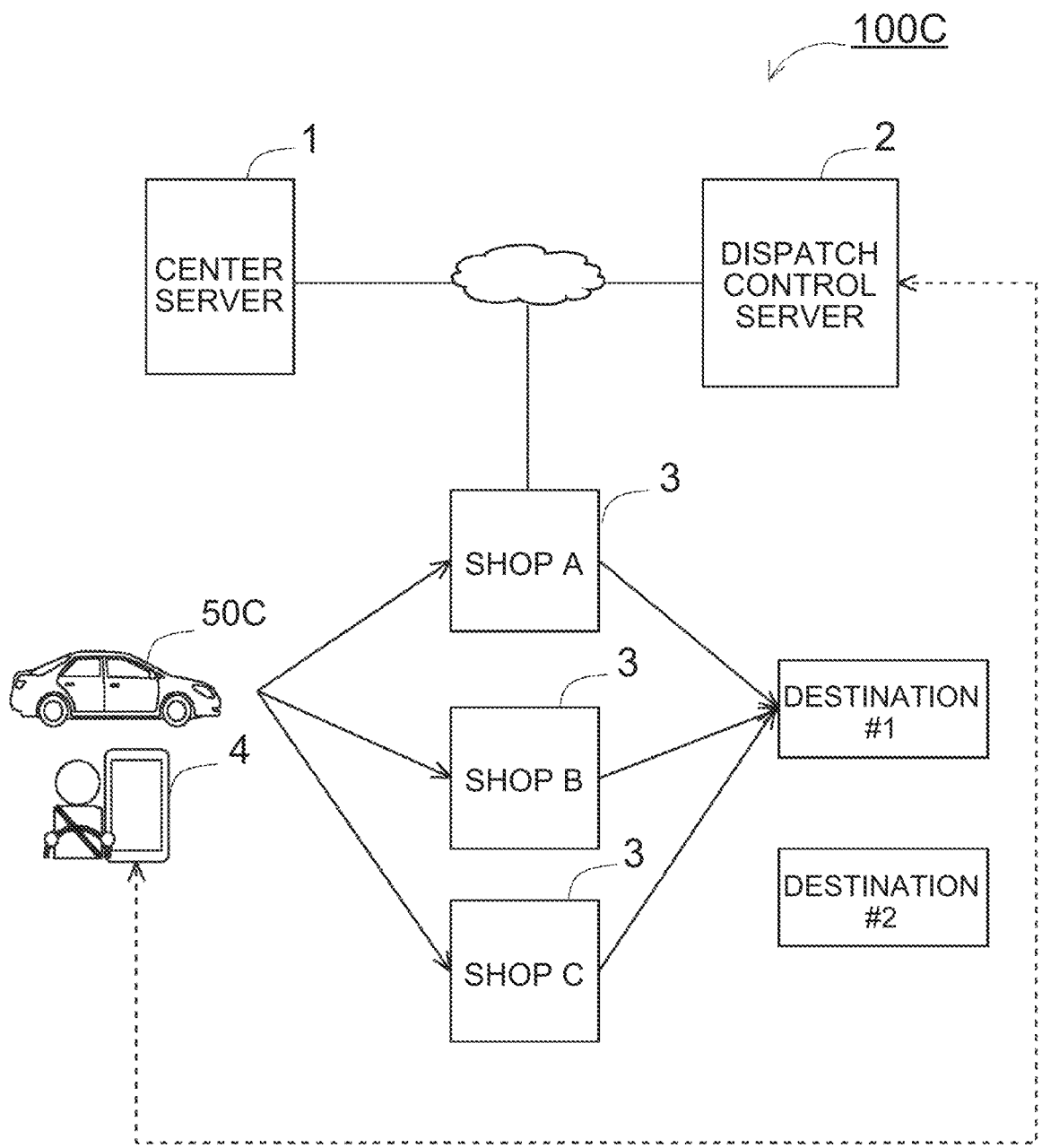
FIG. 13 is a diagram showing an example of the system configuration of a maintenance scheduling system according to a third embodiment.

In a third embodiment, for a vehicle that does not include the in-vehicle device 5, the schedule of the maintenance is created such that the total downtime becomes short. FIG. 13 is a diagram showing an example of the system configuration of a maintenance scheduling system 100C according to the third embodiment.

The maintenance scheduling system 100C includes the center server 1, the dispatch control server 2, the shop server 3 and the user terminal 4. In the third embodiment, for example, the driver of a vehicle 50C inputs the traveling distance of the vehicle 50C and the like to the user terminal 4, and the user terminal 4 sends the traveling state information including the position information about the user terminal 4, the traveling distance of the vehicle 50C and the like to the center server 1 through the dispatch control server 2. Except this point, the process by the center server 1 is the same as that in the first embodiment. The determination about the garage entering of the vehicle 50C is performed based on the traveling state information from the user terminal 4, a shop close to the place where the demand for the dispatch service is predicted to be generated is selected as the shop where the maintenance of the vehicle 50C is performed, and the maintenance schedule information is created. The notice of the created schedule information is given from the center server 1 to the user terminal 4 through the dispatch control server 2. Accordingly, with the third embodiment, also for the maintenance of the vehicle that has no communication function, it is possible to create the schedule such that the loss of the business opportunity is reduced.

Other Embodiments

The above embodiments are just examples, and the present disclosure can be carried out while being appropriately modified without departing from the spirit of the present disclosure.

The processes and means described in the present disclosure can be freely combined and executed, as long as there is no technical inconsistency.

A process described as a process that is performed by a single device may be divided and executed by a plurality of devices. Further, processes described as processes that are performed by different devices may be executed by a single device. In the computer system, the hardware configuration (server configuration) to realize the functions can be flexibly altered.

The present disclosure can realized also when a computer program including the functions described in the above embodiments is supplied to a computer and one or more processors included in the computer read and execute the program. The computer program may be provided to the computer through a non-transitory computer-readable storage medium that can be connected with a system bus of the computer, or may be provided to the computer through a network. Examples of the non-transitory computer-readable storage medium include an arbitrary type of disk such as a magnetic disk (a floppy (R) disk, a hard disk drive (HDD) and the like) and an optical disk (a CD-ROM, a DVD disk, a Blu-ray disk and the like), and an arbitrary type of medium suitable for storing electronic commands, as exemplified by a read only memory (ROM), a random access memory (RAM), an EPROM, an EEPROM, a magnetic card, a flash memory and an optical card.

What is claimed is:

1. An information processing system comprising:
a first vehicle, wherein the first vehicle is operable using autonomous driving;
a control unit comprising a processor that executes:
predicting a first information that includes a generation time and place of a demand for a dispatch service, wherein predicting the first information is based on position information of the first vehicle and a state of each component in the first vehicle, and the position information and state of each component is received wirelessly from an in-vehicle device mounted in the first vehicle;
determining a first place where the demand for the dispatch service is predicted to be generated based on the first information;
creating a first schedule of inspection or repair of the first vehicle that is used for the dispatch service, such that the inspection or the repair of the first vehicle is performed at a first shop and then the first vehicle arrives at the first place on a date and hour when the demand for the dispatch service is predicted to be generated, the first shop being a shop that is within a predetermined distance of the first place and where the inspection or the repair of the first vehicle is capable of being performed; and
control the first vehicle, using the autonomous driving, to move the first vehicle to the first shop based on the first schedule; and
a shop server, wherein the shop server receives the first schedule of inspection or repair for the first vehicle from the control unit,
wherein the control unit acquires a plurality of places where the demand for the dispatch service is predicted to be generated and when there is a plurality of shops where the inspection or the repair of the first vehicle is capable of being performed within the predetermined distance of the plurality of places, the control unit decides that the first place and the first shop are respectively a place and a shop included in a combination for which a total time length of a first time length, a second time length and a third time length is shortest among all combinations of a single place of the plurality of places and a single shop of the plurality of shops, the first time length being a time length that is spent on moving from a predetermined point to the single shop, the second time length being a time length that is spent on the inspection or the repair at the single shop, the third time length being a time length that is spent on moving from the single shop to the single place.

2. The information processing system according to claim 1, wherein:
the control unit acquires a predicted value of a value indicating a level of the demand for the dispatch service, for each of a plurality of places where the demand is predicted to be generated;

the control unit decides that the first place is a place for which the predicted value is highest among the plurality of places; and when there is a plurality of shops where the inspection or the repair of the first vehicle is capable of being performed within the predetermined distance of the first place, the control unit decides that the first shop is a shop that is closest to the first place among the plurality of shops.

3. The information processing system according to claim 1, wherein when the control unit acquires a plurality of places where the demand for the dispatch service is predicted to be generated and there is a plurality of shops where the inspection or the repair of the first vehicle is capable of being performed within the predetermined distance of the plurality of places, the control unit decides that the first place and the first shop are respectively a place and a shop that have a shortest mutual distance.

4. The information processing system according to claim 2, wherein:

the control unit acquires a predicted value of a value indicating a level of the demand for the dispatch service, for a plurality of places where the demand is predicted to be generated; and the control unit decides the first place from places that are of the plurality of places and for which the predicted value is equal to or higher than a predetermined threshold.

5. The information processing system according to claim 1, wherein:

the control unit further executes acquiring traveling state information relevant to traveling of the first vehicle, deciding a planned date and hour of the inspection or the repair of the first vehicle, based on the traveling state information, and acquiring first information about the demand that is predicted to be generated in a range of a predetermined time after the planned date and hour, the first information including at least a place where the demand is predicted to be generated and a date and hour when the demand is predicted to be generated; and the control unit acquires the first place based on the first information.

6. The information processing system according to claim 5, wherein:

the control unit acquires a traveling position of the first vehicle that is estimated to be a traveling position at an hour that is a predetermined time length before the planned date and hour; and the control unit acquires the first information about the demand that is predicted to be generated in a predetermined geographical range from the traveling position.

7. The information processing system according to claim 1, wherein the control unit further executes:

reserving the inspection or the repair of the first vehicle at the first shop, wherein the reserving the inspection is based on at least one unforeseen circumstance; and requesting an arrangement of an implementation order of the inspection or the repair of the first vehicle, to the first shop, when there is a change in the demand for the dispatch service that is predicted to be generated within the predetermined distance of the first shop in the first schedule, the arrangement being such an arrangement that the inspection or the repair of the first vehicle is performed at a first shop and then the first vehicle arrives at a place where a demand after the change is predicted to be generated on a date and hour when the demand after the change is predicted to be generated.

8. The information processing system according to claim 7, wherein when a planned end date and hour of the inspection or the repair in the first schedule is earlier, by a predetermined time length or more, than the date and hour when the demand after the change is predicted to be generated, the control unit sends a notice of permission to decrease a priority of the implementation order of the inspection or the repair of the first vehicle, to the first shop.

9. The information processing system according to claim 7, wherein when a planned end date and hour of the inspection or the repair in the first schedule is equal to or later than the date and hour when the demand after the change is predicted to be generated, the control unit sends an instruction to increase a priority of the implementation order of the inspection or the repair of the first vehicle, to the first shop.

10. An information processing method comprising:

predicting, using a processor, a first information that includes a generation time and place of a demand for a dispatch service, wherein predicting the first information is based on position information of a first vehicle and a state of each component in the first vehicle, the position information and state of each component is received wirelessly from an in-vehicle device mounted in the first vehicle, and the first vehicle is operable using autonomous driving;

determining a first place where the demand for the dispatch service is predicted to be generated based on the first information;

creating a first schedule of inspection or repair of the first vehicle that is used for the dispatch service, such that the inspection or the repair of the first vehicle is performed at a first shop and then the first vehicle arrives at the first place on a date and hour when the demand for the dispatch service is predicted to be generated, the first shop being a shop that is within a predetermined distance of the first place and where the inspection or the repair of the first vehicle is capable of being performed;

controlling the first vehicle, using the autonomous driving, to move the first vehicle to the first shop based on the first schedule; and receiving by a shop server the first schedule of inspection or repair for the first vehicle;

acquiring a plurality of places where the demand for the dispatch service is predicted to be generated, wherein when there is a plurality of shops where the inspection or the repair of the first vehicle is capable of being performed within the predetermined distance of the plurality of places, it is decided that the first place and the first shop are respectively a place and a shop included in a combination for which a total time length of a first time length, a second time length and a third time length is shortest among all combinations of a single place of the plurality of places and a single shop of the plurality of shops, the first time length being a time length that is spent on moving from a predetermined point to the single shop, the second time length being a time length that is spent on the inspection or the repair at the single shop, the third time length being a time length that is spent on moving from the single shop to the single place.

11. The information processing method according to claim 10, wherein:

a predicted value of a value indicating a level of the demand for the dispatch service is acquired for each of a plurality of places where the demand is predicted to be generated; and it is decided that the first place is a place for which the predicted value is highest among the plurality of places, and when there is a plurality of shops where the inspection or the repair of the first vehicle is capable of being performed within the predetermined distance of the first place, it is decided that the first shop is a shop that is closest to the first place among the plurality of shops.

12. The information processing method according to claim 10, wherein when a plurality of places where the demand for the dispatch service is predicted to be generated is acquired and there is a plurality of shops where the inspection or the repair of the first vehicle is capable of being performed within the predetermined distance of the plurality of places, it is decided that the first place and the first shop are respectively a place and a shop that have a shortest mutual distance.

13. The information processing method according to claim 11, wherein:

a predicted value of a value indicating a level of the demand for the dispatch service is acquired for a plurality of places where the demand is predicted to be generated; and the first place is decided from places that are of the plurality of places and for which the predicted value is equal to or higher than a predetermined threshold.

14. The information processing method according to claim 10, further comprising:

acquiring traveling state information relevant to traveling of the first vehicle;

deciding a planned date and hour of the inspection or the repair of the first vehicle, based on the traveling state information; and acquiring first information about the demand that is predicted to be generated in a range of a predetermined time after the planned date and hour, the first information including at least a place where the demand is predicted to be generated and a date and hour when the demand is predicted to be generated, wherein the first place is acquired based on the first information.

15. The information processing method according to claim 14, wherein:

a traveling position of the first vehicle that is estimated to be a traveling position at an hour that is a predetermined time length before the planned date and hour is acquired; and the first information about the demand that is predicted to be generated in a predetermined geographical range from the traveling position is acquired.

16. The information processing method according to claim 10, further comprising:

reserving the inspection or the repair of the first vehicle at the first shop, wherein the reserving the inspection is based on at least one unforeseen circumstance; and requesting an arrangement of an implementation order of the inspection or the repair of the first vehicle, to the first shop, when there is a change in the demand for the dispatch service that is predicted to be generated within the predetermined distance of the first shop in the first schedule, the arrangement being such an arrangement that the inspection or the repair of the first vehicle is performed at a first shop and then the first vehicle arrives at a place where a demand after the change is predicted to be generated on a date and hour when the demand after the change is predicted to be generated.

17. The information processing method according to claim 16, wherein when a planned end date and hour of the inspection or the repair in the first schedule is earlier, by a predetermined time length or more, than the date and hour when the demand after the change is predicted to be generated, a notice of permission to decrease a priority of the implementation order of the inspection or the repair of the first vehicle is sent to the first shop.

18. The information processing method according to claim 16, wherein when a planned end date and hour of the inspection or the repair in the first schedule is equal to or later than the date and hour when the demand after the change is predicted to be generated, an instruction to increase a priority of the implementation order of the inspection or the repair of the first vehicle is sent to the first shop.

* * * * *